United States Patent [19]

Cullinan

[11] 4,331,118
[45] May 25, 1982

[54] PRIMARY-SECONDARY INDUCTION INTERNAL COMBUSTION ENGINE

[76] Inventor: John R. Cullinan, 2323 235th Pl., Torrance, Calif. 90501

[21] Appl. No.: 129,393

[22] Filed: Mar. 11, 1980

Related U.S. Application Data

[63] Continuation of Ser. No. 925,040, Jul. 17, 1978, abandoned.

[51] Int. Cl.³ ............................................. F02B 15/00
[52] U.S. Cl. ..................................... 123/433; 123/308
[58] Field of Search ...................... 123/73 A, 308, 311, 123/432, 433

[56] References Cited

U.S. PATENT DOCUMENTS

| | | | |
|---|---|---|---|
| 1,589,662 | 6/1926 | Ricardo | 123/433 |
| 1,629,327 | 5/1927 | Waldo | 123/433 |
| 3,905,340 | 9/1975 | Boyesen | 123/73 A |

FOREIGN PATENT DOCUMENTS

| | | | |
|---|---|---|---|
| 890143 | 9/1953 | Fed. Rep. of Germany | 123/433 |
| 2644875 | 4/1978 | Fed. Rep. of Germany | 123/432 |
| 615624 | 1/1927 | France | 123/433 |
| 111152 | 4/1947 | Netherlands | 123/433 |

*Primary Examiner*—Craig R. Feinberg
*Assistant Examiner*—W. R. Wolfe
*Attorney, Agent, or Firm*—William H. Maxwell

[57] ABSTRACT

An internal combustion engine of the four cycle reciprocating piston type wherein intake and exhaust of working fluid and combustible fuel into the engine is primarily by means of valves in the cylinder head, and secondarily by means of an intake port in open communication with the lower portion of the cylinder chamber for the induction of additional gases for the support of combustion, and preferably a combustible mixture controlled by valve means for induction only.

10 Claims, 4 Drawing Figures

4,331,118

PRIMARY-SECONDARY INDUCTION INTERNAL COMBUSTION ENGINE

This application is a continuation of co-pending application Ser. No. 925,040 filed July 17, 1978, now abandoned, entitled PRIMARY-SECONDARY INDUCTION INTERNAL COMBUSTION ENGINE.

BACKGROUND

This invention relates to internal combustion engines of the four cycle reciprocating type wherein a first down stroke of a piston effects intake of working fluid following the preceding exhaust, followed by a first up stroke of the piston that effects compression of said working fluid, followed by a second down stroke of the piston as a result of combustion and expansion of the working fluid, and finally followed by a second up stroke of the piston that effects exhaust and expanding of said working fluid.

Poppet valves are highly developed and used for opening and closing head ports for the intake and exhaust of working fluid, it being customary to open and close valves in advance of top-dead-center and bottom-dead-center positions of the crank shaft, and to have so-called valve overlap during which the exhaust valve remains open while the intake valve is opened. Combustion chamber shape is critical in relation to the positions of said valves and shape of the piston head, and there are problems with scavenging the exhaust gases by means of displacement with intake gases. The engine design configurations become more critical with high performance engines operating at high speeds of rotation, carburetion and/or fuel injection together with filling the cylinder on the intake stroke becoming a limiting factor. That is, suction of the downward moving piston cannot draw in a full measure of fuel-air mixture through the intake port in the head that covers the cylinder. Accordingly, it is an object of this invention to provide cylinder charging means by which the cylinder is opened to additional air and/or a carbureted mixture thereof.

The down stroke of the piston during the intake cycle creates a partial vacuum in the cylinder, and normally sucks air and/or carbureted mixture into and partially fills the cylinder; that is, to an extent that time permits outside pressure to force the air-fuel mixture to enter therein. Fluid dynamics prevents complete filling to atmospheric pressure, and in order to achieve best results the intake valve is opened substantially before top-dead-center position and is closed substantially after bottom-dead-center position (of the crank and piston). It becomes apparent therefore that the lower portion of the intake stroke is characterized by an open cylinder, permitting the in rush inertia of gases to fill the cylinder as much as possible prior to closing the intake valve for the compression stroke. Thus, the actual compression of gases does not commence until the piston is well on its excursion in the up stroke, in practice approximately midway therealong. Accordingly, it is another object of this invention to open the cylinder to additional charging throughout the lower portion of the intake and compression strokes of the piston, to additionally charge the cylinder with air and/or carbureted mixture. In practice, the lower portion of the cylinder chamber is ported laterally to an air intake stack and carburetion or fuel injection.

Engines of the type under consideration are highly developed, and accordingly it is still another object of this invention to utilize such engines substantially without change, adding thereto the features of the present invention which greatly improved performance. As shown, the cylinder charging means is adapted to the induction side of the engine cylinder and head combination, adding an intake stack in open communication with the lower portion of the cylinder chamber and characterized by a carburetor protected by valve means, preferably a check valve that permits induction only.

SUMMARY OF INVENTION

The primary-secondary induction engine of the present invention is of the four stroke type wherein each cycle is represented by a piston movement, up or down in the cylinder. The crank and piston movements are essentially the same with respect to valve timing as they are in a so-called "stock", "race", or "full race" engine. That is, the opening and closing of both intake and exhaust valves in the conventional engine head may remain essentially the same, although it is to be understood that the charging means herein provided can vary the timing requirements for optimum performance as circumstances require. Cam shaft control can be varied, and the cylinders replaced or ported as hereinafter described to accommodate the additional intake stack which characterizes this invention. High resonant frequencies associated with high speed operation are provided for in the valve means which controls the intake gases, and the carburetion applied therethrough not only supplements the carburetion applied through conventional valving in the engine head but replaces the same at high engine speeds when said original valves tend to become inefficient.

DRAWINGS

The various objects and features of this invention will be fully understood from the following detailed description of the typical preferred form and application thereof, throughout which description reference is made to the accompanying drawings, in which.

PREFERRED EMBODIMENT

Figure 1:
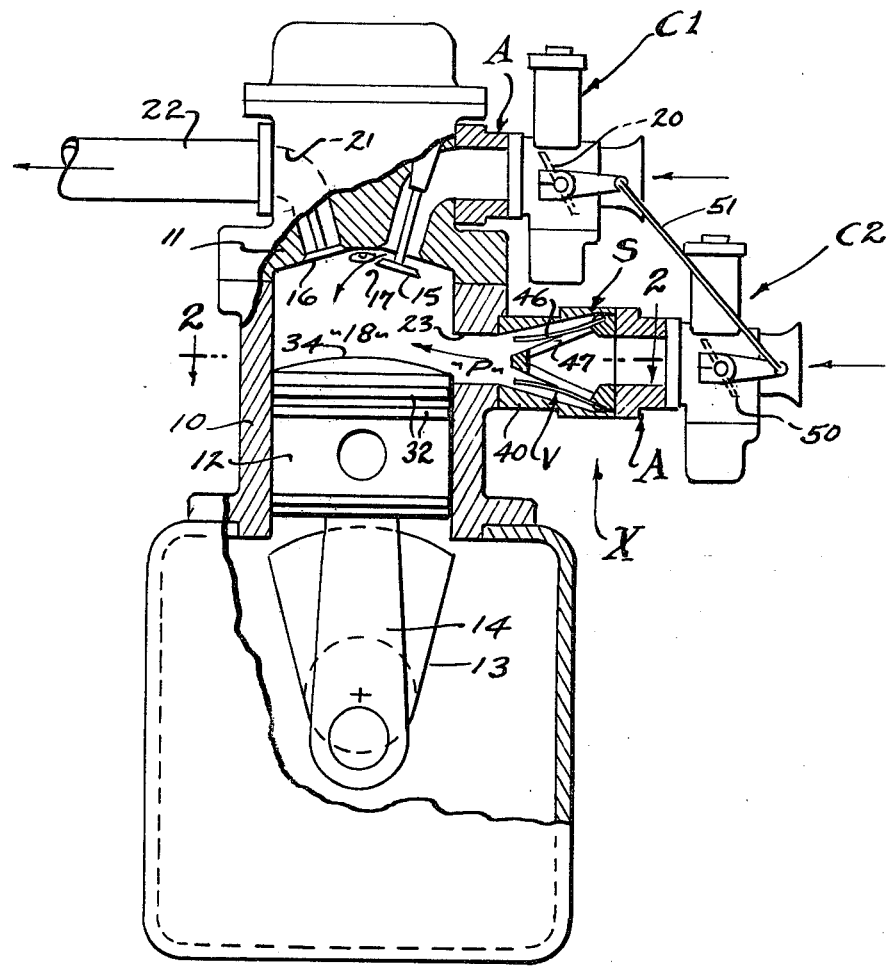
FIG. 1 is a sectional view taken through the engine, with its piston at bottom-dead-center and opening the secondary induction means.

Referring now to the drawings, the basic internal combustion engine involves generally a cylinder 10 closed by a head 11 and in which a piston 12 reciprocates between top- and bottom-dead-center positions of a crank shaft 13 to which it is coupled by a connecting rod 14. The engine frame, head structure and crank case are conventional. However, the cylinder structure is unique with this invention, as it incorporates the novel combination therewith of an induction stack and cooperatively related fuel admixture means, preferably a valve controlled carburetor. As shown, the head 11 has overhead valves 15 and 16 to alternately open and close a hemispherical combustion chamber 17 overlying a cylinder chamber 18, it being understood that the head and valve configuration and/or location of the latter can vary as may be required.

Figure 3:
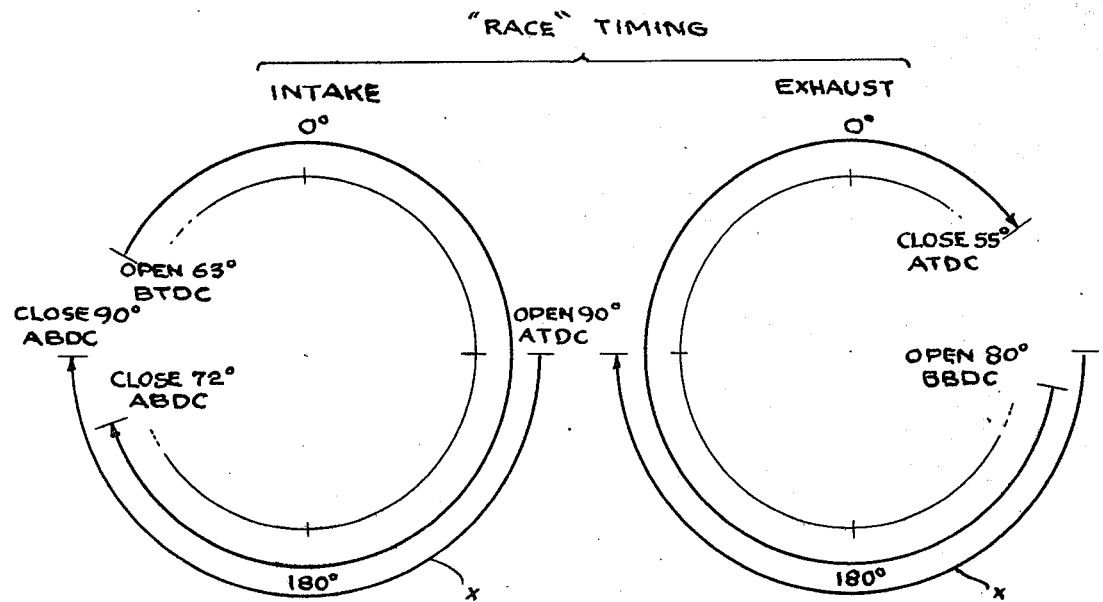
FIG. 3 is a timing diagram of the engine.
Figure 4:
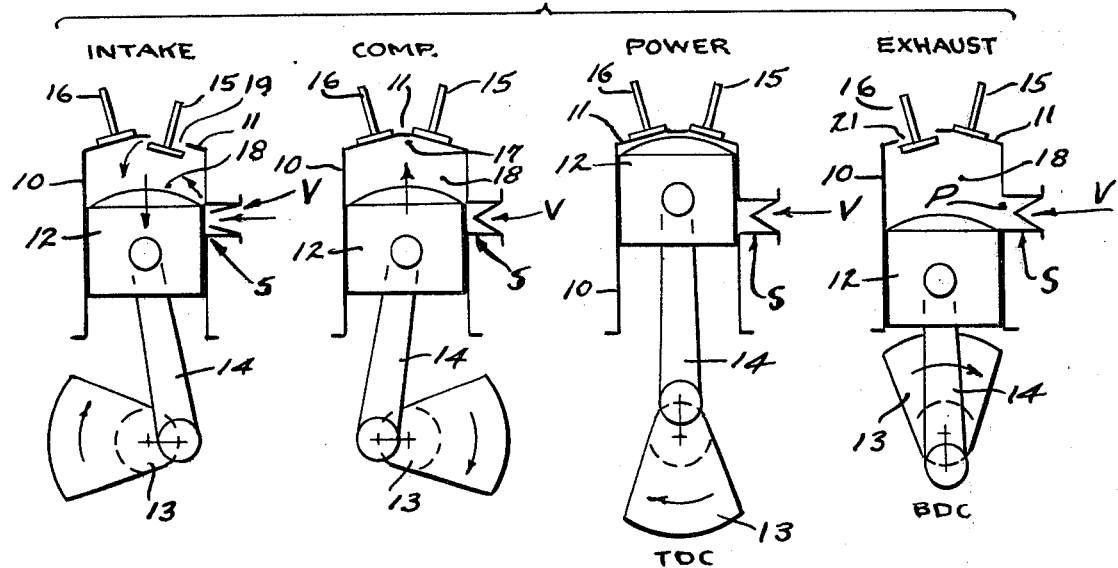
FIG. 4 are diagramatic views showing the intake compression power and exhaust strokes of the engine.

The valve 15 is the intake valve that opens and closes the intake port 19 drawing a gas charge through a throttle control 20 and preferably through a carburetor C1, it being understood that fuel injection (not shown) can be employed. The valve 16 is the exhaust valve that opens and closes the exhaust port 21 discharging gases through an exhaust stack 22 to atmosphere. FIG. 3 is a diagram illustrating typical inlet and exhaust valve timing embraced by a diagrammatic segment x showing the timed effect of the cylinder charging means X herein disclosed and through which gases are induced into the lower portion of the cylinder chamber 18. Note; that the intake opens before top-dead-center while the exhaust closes after top-dead-center, establishing a valve overlap; that both intake and exhaust remain closed throughout the greater portion of the compression and power strokes; and, that the exhaust opens before bottom-dead-center, during the power stroke, while the intake closes after bottom-dead-center, after the intake stroke. Significantly, the diagram segment x embraces generally the latter open period of the intake valve 15.

Referring now to the cylinder charging means X of the present invention, there is a cylinder port P opening into the lower portion of the cylinder chamber 18, an induction stack S extending laterally from the port, valve means V controlling induction of gases, and a carburetor C2 or the like (alternately fuel injection) operating through said stack and valve means. Whether finned or water jacketed, the cylinder 10 is provided with a base 30 surrounding the port P of lantern configuration with vertical bars 31 for guide engagement with the piston rings 32. In carrying out this invention the port P is positioned so that its uppermost extremity wall 23 is uncovered (commencing on the down stroke) by the top 34 of the piston 12 at mid stroke between top-and-bottom-dead-center; and its lowermost extremity wall 35 is closely approached by the said top 34 at bottom-dead-center. It is the distance between walls 23 and 35 which defines the lower portion of the cylinder chamber 18.

Figure 2:
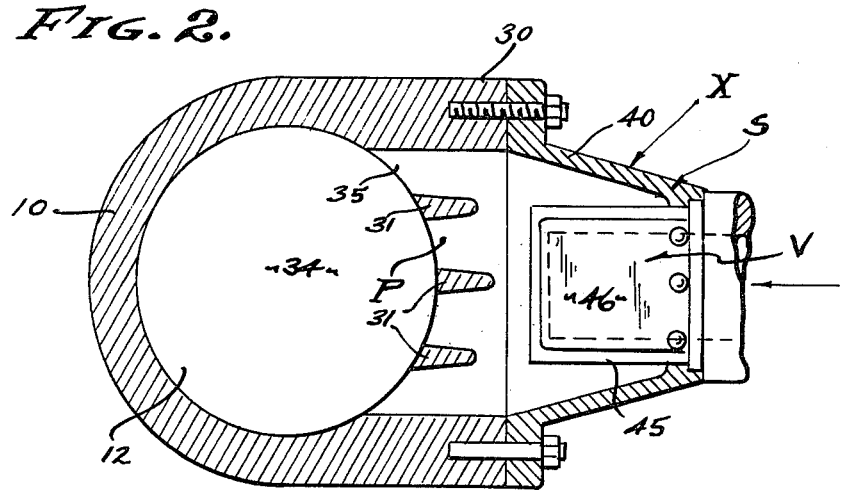
FIG. 2 is an enlarged sectional view taken as indicated by line 2—2 on FIG. 1.

The induction stack S is a tubular member 40 secured to the box 30 as by means of threaded studs, having a transition opening therethrough from the diameter of the carburetor throttle to the width of the port P (see FIG. 2). That is, the stack is preferably funnel-shaped and of limited height as restricted by the spacing of walls 23 and 35.

The valve means V is provided to restrict the movement of gases through stack S for induction flow into the cylinder chamber 18, and for preventing compression and power gases from backing into the carburetor C2. The valve means V can be positively operated in timed relation to engine operation, or as shown it is preferably a reed-type check valve disposed to pass gases through the stack S and only into cylinder chamber 18. In practice, the valve means V comprises a convergent body 45 seated in the open end of stack S and having at least one leaf 46 of flexible material lying over an opening 47 through said body. The leaf 46 is preferably a resilient metallic spring responsive to vacuum within the cylinder chamber 18 to pass induction gases; and it is conversely responsive to positive pressure of compression and power stroke gases to close the opening 47. The leaf 46 is essentially a resonant reed that is tuned to vibrate efficiently within the high speed range of the engine, so as to pass induction gases into the cylinder chamber 18 and thereby improve engine operation.

In accordance with this invention, additional gases are induced to flow into the cylinder chamber 18 by virtue of the vacuum present during the lower portion of the intake stroke, independent of the intake through valve 15. That is additional gases can be air alone, but preferably a fuel injected or carbureted mixture. Accordingly, the carburetor C2 is shown to feed the stack S with a combustible air-fuel mixture through an adapter A, governed by a throttle control 50 synchronized with movement of throttle control 20 of carburetor C1 by means of linkage 51.

From the foregoing it will be seen that low speed operation of the engine is primarily dependent upon carburetor C1 and that higher speed operation thereof becomes additionally dependent upon carburetor C2. At higher engine RPM the cylinder chamber is more deprived of intake gases through carburetor C1 and thereby establishes the vacuum within cylinder chamber 18, the demand of which is supplied by carburetor C2. The valve means V is tuned to high speed operation for efficiency within the range of RPM where high torque is required.

Having described only a typical preferred form and application of my invention, I do not wish to be limited or restricted to the specific details herein set forth, but wish to reserve to myself any modifications or variations that may appear to those skilled in the art as set forth within the limits of the following claims:

I claim:

1. A four stroke Otto Cycle cylinder and piston engine having dual range low and high speed performance, and including; a head closing the upper end of a cylinder and establishing a chamber in which a piston reciprocates by means of a crank and rod connection between top-and-bottom-dead-center positions, a primary working fluid induction means operating in timed relation to both low and high engine speed and comprising an intake valve in the head and fuel-air admixture means open therethrough during the intake stroke, and exhaust means operating in timed relation to both low and high engine speed and comprising an exhaust valve in the head and a stack open therefrom during the exhaust stroke, and secondary working fluid induction means comprising a port opening into the cylinder chamber and with its upper extremity substantially midway between top-and-bottom-dead-center positions of the top of the piston and with its lower extremity at said bottom-dead-center position thereof, and resonant check valve means biased to remain closed at low engine speed and resonant to open said port intermittently in timed relation to high engine speed for the efficient induction of secondary working fluid through said port from fuel-air admixture means and into the cylinder at a tuned frequency of movement of the top of the piston between said top-and-bottom-dead-center positions thereof when uncovering said port for said induction.

2. The internal combustion engine as set forth in claim 1, wherein the secondary working fluid induction means includes carburetor means opening to said port.

3. The internal combustion engine as set forth in claim 1, wherein the secondary working fluid induction means includes carburetor means opening to said port through said resonant check valve means.

4. The internal combustion engine as set forth in claim 1, wherein the valve means for the secondary working fluid induction means is a resonant reed valve tuned to vibrate at a frequency of operation within a piston frequency range of movement during engine operation where it is to be effective.

5. A four stroke internal combustion reciprocating piston and cylinder engine having dual range low and high speed performance, and including; a primary working fluid induction means operating in timed relation to both low and high engine speed and comprising an intake valve in a head closing the upper end of the cylinder and establishing a cylinder chamber, exhaust valve means in said head and operating in timed relation to both low and high engine speed, and secondary working fluid induction means comprising a port opening into the cylinder chamber and with its upper extremity substantially midway between top-and-bottom-dead-center positions of the top of the piston and with its lower extremity at said bottom-dead-center position thereof, and resonant check valve means biased to remain closed at low engine speed and resonant to open said port intermittently in timed relation to high engine speed for the efficient induction of secondary working fluid through said port and into the cylinder at a tuned frequency of movement of the top of the piston between said top-and-bottom-dead-center positions thereof when uncovering said port for induction.

6. The internal combustion engine as set forth in claim 5, wherein the secondary working fluid induction means includes a fuel-air admixture means opening to said port.

7. The internal combustion engine as set forth in claim 5, wherein the secondary working fluid induction means includes a fuel-air admixture means opening to said port through said resonant check valve means.

8. The internal combustion engine as set forth in claim 5, wherein the secondary working fluid induction means includes carburetor means opening to said port.

9. The internal combustion engine as set forth in claim 5, wherein the secondary working fluid induction means includes carburetor means opening to said port through said resonant check valve means.

10. The internal combustion engine as set forth in claim 5, wherein the resonant check valve means for the secondary working fluid induction means is a resonant reed valve tuned to vibrate at a frequency of operation within a piston frequency range of movement during engine operation where it is to be effective.

* * * * *